United States Patent Office 3,357,931
Patented Dec. 12, 1967

3,357,931
SULFONATED POLYMERIC PHOSPHONITRILES
Rip G. Rice, Ashton, and Michael V. Ernest, Baltimore, Md., assignors to W. R. Grace & Co., New York, N.Y., a corporation of Connecticut
No Drawing. Filed Mar. 23, 1964, Ser. No. 354,151
10 Claims. (Cl. 260—2.2)

ABSTRACT OF THE DISCLOSURE

Novel sulfonated phosphonitrilic condensation products are obtained by sulfonating a trimeric triphosphonitrile polyhydroxy aromatic condensation product with excess oleum. The products find utility as high temperature ion exchange resins.

---

The present invention relates to the preparation of novel phosphonitrilic derivatives and more specifically to sulfonated polymeric phosphonitriles which find useful application as ion exchange resins.

Sulfonated ion exchange resins have found increasingly widespread use over recent years. These resins, particularly those of the sulfonated styrene variety, are useful where it is desired to remove ionic impurities from both aqueous and nonaqueous solutions at moderate temperatures.

While prior art sulfonated resins perform exceedingly well at low to moderate temperatures, it is invariably found these resins are unsatisfactory in systems operating in excess of about 150° C. The primary reason for failure is the melting and thermodegradation of the organic resin supporting systems heretofore used in preparing the sulfonated ion exchange resin.

To obtain a sulfonated ion exchange resin which will operate at temperatures in excess of about 150° C., a resin system must be developed which will (1) physically withstand elevated temperatures, and (2) be susceptible to sulfonation. Numerous inorganic and semi-inorganic resins are known to readily meet the first requirement of high temperature resistance. Resins based on phosphonitrilic rings are particularly attractive examples of high temperature resin materials. It is found however, that few of the phosphonitrilic resins heretofore disclosed in the art, are capable of being sulfonated.

It is therefore an object of the present invention to provide novel sulfonated phosphonitrilic polymers.

It is another object to provide sulfonated phosphonitrilic polymers which find valuable utility as high temperature resistant ion exchange resins.

These and still further objects of the present invention will become readily apparent to one skilled in the art from the following detailed description and specific examples.

Broadly, the present invention contemplates novel sulfonated phosphonitrilic condensation products, which are obtained by sulfonating a condensation product of cis and/or trans-2,4,6-trichloro - 2,4,6 - triphenyltriphosphonitrile ($\phi$PNCl)$_3$, and a polyhydroxy aromatic compound with an excess of oleum, i.e., fuming sulfuric acid.

These condensation products may be broadly described as polyesters having 2 to about 10 repeating phosphonitrilic units bonded together and completely esterified by polyhydroxy aromatic residues. A substantial number, or all of the noncoupling polyhydroxy aromatic residues attached to the phosphonitrilic ring are substituted by sulfonic groups.

More specifically we have found that a useful semi-inorganic phosphonitrilic resin may be prepared by the condensation of ($\phi$PNCl)$_3$ and a polyhydroxy aromatic compound of the general formula:

$$R(OH)_x$$

wherein R is a polyvalent aromatic residue and $x$ has a value of 2 to 3 in the presence of a tertiary amine. This resin thus may be readily sulfonated by reaction at a temperature of from about 25 to about 65° C. with oleum which contains from about 5 to about 25% by weight of sulfur trioxide. The sulfonated resin may then be further crosslinked by reaction with formaldehyde to obtain a material of desired molecular weight. The resultant product which contains up to about 2.5 milliequivalents of sulfonic group per gram has the ability to withstand temperatures in excess of 150° C. when performing as an ion exchange resin.

Preparation of phosphonitrilic resin

As mentioned previously, the resins used in the practice of the present invention are prepared by the condensation of cis and/or trans-2,4,6-trichloro-2,4,6-triphenyltriphosphonitrile with a polyhydroxy aromatic compound. Typical structures of the resins formed by this condensation may be depicted by the following structural formulae:

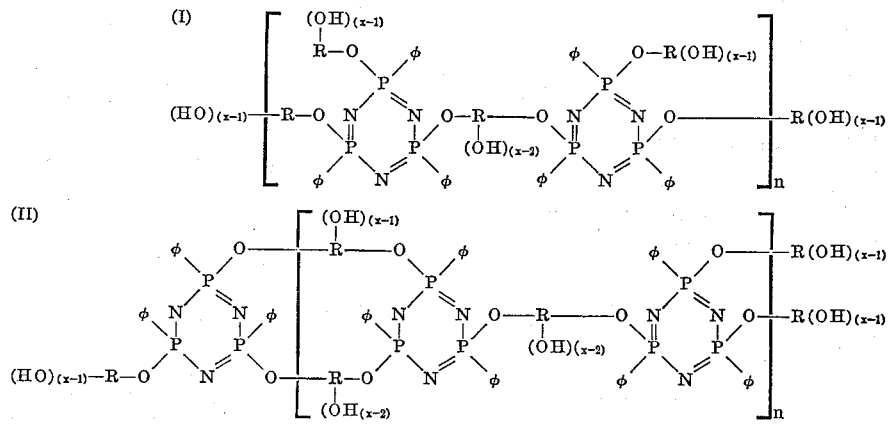

wherein R in the above formulae is selected from aromatic radicals having the following formulae:

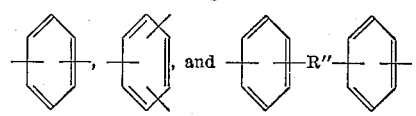

wherein R" is lower alkylene having 1 to 4 carbon atoms, oxygen, sulfur, NH, etc.; $x$ has a value of 2 or 3, and $n$ has a value of 1 to about 5.

An important distinction between Structures I and II is that the PN rings of Structure I are linked together by only one polyhydroxyaromatic residue and many hydroxyphenoxy groups are present. This gives rise to products having hydroxyl contents of about 4.5 to about 10%.

On the other hand, in Structure II about half of the PN rings are linked together by two polyhydroxyaromatic residues, whereas the other half of the PN rings are linked together by only one residue, as is Structure I. This gives rise to condensation products having lower hydroxyl contents, on the order of about 1.0 to about 4.5%.

The condensation products set forth in Formulae I and II are merely representative of the condensates obtained by the reaction of $(\phi PNCl)_3$ and the polyhydroxy compound. And while Structures I and II may predominate in a given condensation mixture, depending on reaction conditions employed, it is to be understood that the phosphonitrilic resins contemplated herein comprise a mixture of individual compounds. These compounds may contain from 2 up to about 10 phosphonitrilic units derived from $(\phi PNCl)_3$, bonded together and esterified by various numbers of polyhydroxy aromatic residues.

Such structures might be typically represented by the following repeating structural unit:

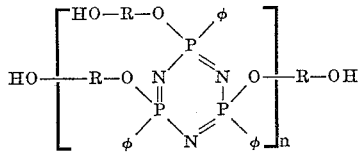

wherein R has the meanings given previously, and $n$ has a value of from 2 to 10.

In general, it is found that the present resins will contain from about 1.6 (in the case of 10 PN rings) to 2.5 (in the case of 2 PN rings) aromatic residues derived from the polyhydroxy aromatic units per phosphonitrilic unit. The exact ratio of polyhydroxy residue per phosphonitrilic ring present will depend to some extent on the manner in which the phosphonitrilic rings are linked together. For example, some rings may be bonded together by means of two polyhydroxy aromatic residues, others by only one.

The polyhydroxyaromatic compounds used to prepare the desired condensation products are those materials which contain at least one aromatic group and at least two hydroxyl groups. These hydroxyl groups may or may not be situated on the same aromatic ring, in cases where more than one aromatic moiety is present in the polyhydroxy molecule.

Examples of polyhydroxy aromatic compounds useful in the condensation process are the benzenediols, e.g., hydroquinone, resorcinol and catechol, and the benzenetriols, e.g., phloroglucinol and pyrogallol. Also useful are diphenol derivatives of lower alkanes, such as 2,2-propyl-p,p'-diphenol, known to the art as bisphenol-A, dihydroxydiphenylmethane, dihydroxydiphenyl ether, dihydroxydiphenylsulfide, diphenolic acid $$(HOC_6H_4)_2CH(CH_3)(CH_2)_2CO_2H$$

and the polyhydroxynaphthalenes, anthracenes and the like.

Preferred compounds, however, are the difunctional hydroxyaromatics in particular hydroquinone, resorcinol and bisphenol-A.

It should be noted that the present products are substantially, completely esterified and the resultant resins contain no residual chlorine. This is a preferred composition, since residual chlorine groups can hydrolyze readily in air, thus resulting in decomposition of the resin. Generally, the above described phosphonitrilic-polyhydroxy aromatic condensation products are formed by reacting an amount of $(\phi PNCl)_3$ with at least 3.5 fold molar excess of polyhydroxy aromatic compound. During the condensation hydrogen chloride is evolved which is absorbed preferably by a heterocyclic water soluble tertiary amine which is present in the condensation mixture. Typical preferred tertiary amines are pyridine, the $\alpha$, $\beta$ and $\gamma$-picolines, and the 2,4-, 2,5-, 2,6-, 3,5-lutidines. Pyridine itself is preferred.

The tertiary amine functions as more than a mere HCl acceptor, however. Its presence is required to lower the temperature of the reaction as well as to avoid the presence of HCl in the reaction mixture. In the absence of tertiary amine, temperatures above 150° C. are required to initiate reaction. In this case, however, a large amount of gaseous HCl is evolved. This results in rupture of the phosphonitrilic ring, and the products thus obtained are insoluble, and contain large amounts of residual chlorine.

It is required to employ a water soluble amine in order to simplify the process for isolation of the condensation products, as described later.

The condensation is conducted using an amount of tertiary amine at least equivalent to the amount of HCl quantitatively evolved during the condensation and preferably a slight excess. The condensation is carried out at a temperature of from about 60 to about 150° C. and reaction periods on the order of from about 0.5 to about 10 hours are sufficient to achieve the desired result.

The condensation is preferably carried out in the presence of an inert reaction medium such as benzene, carbon tetrachloride, methyl ethyl ketone, heptane, ethyl acetate and pyridine itself. To obtain condensation Product I, solvents such as dioxane and hydrocarbon are preferred. On the other hand, when Product II is desired, the condensation is carried out in ketones such as methyl ethyl ketone.

Subsequent to the reaction the resin is recovered by first removing most of the reaction medium by decantation, then vacuum evaporation of the remainder and subsequently precipitating the residue by slowly adding an acetic acid solution to a large excess of water.

In a generally preferred method for preparing the resin, from about 7 to about 14 equivalents of polyhydroxy aromatic compound (based on the hydroxy substituents present in the compound) are condensed per mole of $(\phi PNCl)_3$. Generally speaking from about 4 to about 8 moles of tertiary amine are present to absorb or accept HCl which is evolved during this condensation. The reactants are suspended or dissolved in from about 50 to about 1000 weights of inert reaction medium per total weight of reactants. The workup procedure involves removal of the reaction solvent and subsequent precipitation of the product from an acetic acid solution by addition into water.

*Preparation of sulfonated resin*

The phosphonitrilic-polyhydroxy aromatic condensation products obtained by the aforementioned procedure are sulfonated using oleum, which comprises 100% sulfuric acid containing from about 5 to about 25% by weight of added $SO_3$. In a preferred procedure from about 3 to about 7 parts by weight of the aforementioned oleum mixture is used per weight of phosphonitrilic-polyhydroxy aromatic condensation product. The exact amount of sulfur trioxide used during sulfonation will depend to some extent on the degree of sulfonation desired. Thus, where the phosphonitrilic condensation product contains four hydroxy aromatic substituents capable of being sulfonated, at least four equivalents of sulfur trioxide per mole of resin are required to obtain a fully sulfonated product. On the other hand, as little as one equivalent of sulfur trioxide may be used to obtain a partially sulfonated product.

During the reaction, the mixture is maintained at a temperature of from about 25 to about 65° C. At this temperature it is found that sulfonation is substantially complete in from about 24 to about 48 hours. Subsequent to sulfonation, the product is admixed with an acidic aqueous solution whereupon the desired sulfonated resin will precipitate and may be recovered by filtration.

When the condensation Products I and II defined previously are used in this sulfonation process, compounds of the following general formulae are obtained.

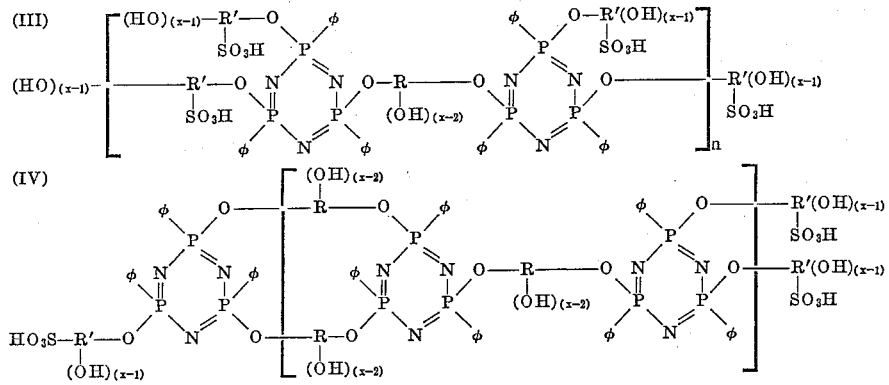

In the above formulae R is selected from the group consisting of

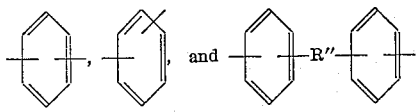

wherein R" is lower alkyl having 1 to 4 carbon atoms, oxygen, sulfur, —NH—, etc.; $x$ is 2 or 3; $n$ has a value of 1 to about 5; and R' is R with an additional valence formed through sulfonation.

The resins obtained by this procedure contain two to about twelve sulfonic sulfonic acid groups and are stable at temperatures up to about 350° C. These resins are extremely useful as high temperature cation exchange resins.

*Preparation of cross-linked products*

When it is desired to further extend the molecular weight of the above sulfonated resins, it is found the resins may be cross-linked using formaldehyde, which is available conveniently from hexamethylenetetramine. In this manner, a series of sulfonated resin groups is obtained which are linked through methylene $-(CH_2)-$ groups. These extended or crosslinked resins are particularly useful in high temperature aqueous solutions. For example, the crosslinked structure may be depicted by the following general formula when sulfonated resin (III) is used.

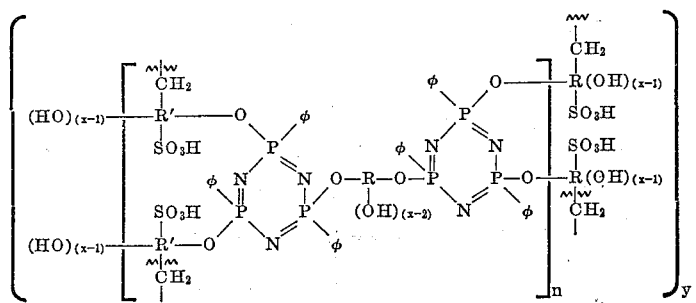

wherein $\phi$ is phenyl, R and R' have the meanings set forth previously, $n$ has a value of 1 to about 5 and $y$ may have a value of 1 to 50 or more, depending on the degree of crosslinking which is achieved through methylene groups extending from R'.

The crosslinking reaction is carried out using from about 10 to about 20 moles of formaldehyde, or the corresponding amount of hexamethylenetetramine, per mole of sulfonated resin. The reaction is carried out at a temperature of from about 60 to about 230° C. and is substantially complete in from about 24 to about 48 hours. The reaction is carried out in the presence of solvents such as $H_2O$, $CH_3OH$, $C_2H_5OH$, $(CH_3)_2CO$, etc., wherein from about 5 to about 20 parts by weight of solvent are used per weight of reactants.

Having described the basic aspects of the present invention, the following specific examples are given to illustrate embodiments thereof.

EXAMPLE I

In this example the preparation of a phosphonitrilic-poly-hydroxy aromatic resin is illustrated.

A mixture of 100 g. of $(\phi PNCl)_3$, 85.3 g. of hydroquinone, and 1500 ml. of benzene is brought to reflux in a 3-neck round bottom flask equipped with stirrer, heating means and reflux condenser. At this point the $(\phi PNCl)_3$ is completely dissolved in the benzene whereas the hydroquinone remains insoluble. When reflux temperature is reached the heating is discontinued temporarily and 127 ml. of anhydrous pyridine is added rapidly by way of the reflux condenser.

Upon the addition of pyridine, opalescence is observed and an insoluble oil is formed. Refluxing reaction then is continued 4 hours with continued agitation.

Subsequent to the 4 hour reaction period, a supernatant layer of solvent is removed by decantation while hot. The last traces of solvent are removed under vacuum. The residual oil is dissolved in 500 ml. of glacial acetic acid and the mixture is transferred to a dropping funnel. To the acid solution is added 25 ml. of water slowly with continuous agitation. The purpose of the water is to reduce the viscosity of the acetic acid solution. This solution is then transferred dropwise to 2½ to 3 gals. of water which is under constant agitation. Upon addition to the large body of water the resin precipitates. The precipitated product is agitated for 1 to 2 hours, in order to absorb acetic acid. The precipitate is then filtered, washed with about a gallon of water and dried in a vacuum oven at 60–70° C. The finished resin is a white, amorphous solid which has the following elemental analysis: C, 61.38%; H, 4.32%; N, 6.74%; P, 13.76%; OH, 5.8%; Cl, 0.0%; molecular weight, 1062. This elemental analysis closely resembles that of the following dimeric structure.

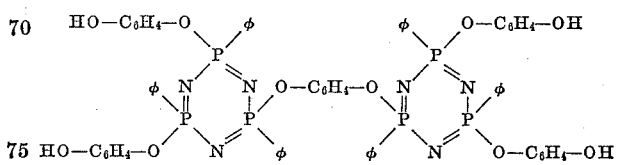

Calculated for $C_6H_{54}P_6N_6O_{10}$: C, 62.07; H, 4.26; N, 6.58; P, 14.56; OH, 5.33; molecular weight, 1277.

EXAMPLE II

The procedure of Example I was carried out except that 85.3 g. of resorcinol was employed in place of hydroquinone. The product isolated (106.3 g.) analyzed similarly to the product of Example I, and has a molecular weight of 1366.

EXAMPLE III

The procedure of Example I was carried out, except that 3.00 moles of bisphenol-A were employed per mole of $(\phi PNCl)_3$. From 10.3 g. of $(\phi PNCl)_3$ there was obtained 16.4 g. of condensation product which melted at 85–250° C.

EXAMPLE IV

To 50 g. of the condensation product obtained in Example I, was added 250 ml. of a mixture comprising 75 ml. of 30–33% oleum, and 175 ml. of concentrated sulfuric acid. Upon this addition the solution became black and an exothermic reaction took place. The solution was stirred 24 hrs. at room temperature, then poured dropwise into 1.1 of well agitated water. The precipitate was filtered and dissolved in a large excess of water. This solution was then filtered to remove a small amount of water insoluble material, and the filtrate was acidified with HCl. This resulted in precipitation of the product. The mixture was filtered to recover the product which was dried. This yielded 33.5 g. of sulfonated condensation product which contained 4 sulfonic acid groups per mole. This product possessed the following elemental analysis: C, 49.25%; H, 4.01%; P, 11.79%; N, 4.95%; S, 7.41%; molecular weight, 1629. This elemental analysis corresponds closely to that of the following structural formulae:

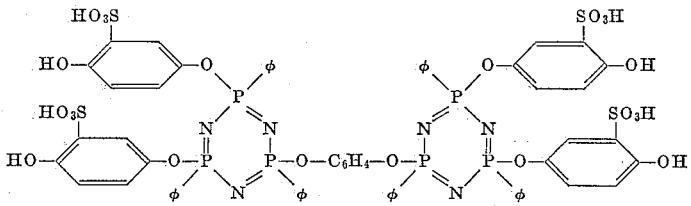

Calculated for $C_{66}H_{54}P_6N_6S_4O_{22}$: C, 48.86; H, 3.46; N, 5.34; P, 11.81; S, 8.15; molecular weight, 1597.

This material is only slightly soluble in cold water and dimethylformamide, soluble in hot water and dilute alkalies, insoluble in acetone, ethyl alcohol, chloroform, ethyl ether and pyridine.

EXAMPLE V

The product of Example II was sulfonated in similar fashion, giving a tetrasulfonic acid which analyzed similar to the product of Example II.

EXAMPLE VI

The product of Example III was sulfonated in similar manner, giving a polysulfonic acid.

EXAMPLE VII

The procedure of Example II was followed except that 200 g. of the hydroquinone-$(\phi PNCl)_3$ condensation product obtained in Example I and 400 ml. of 10% oleum was used. The solution was stirred 48 hrs. at room temperature. This yielded 117.1 g. of the tetrasulfonated product obtained in Example IV.

EXAMPLE VIII

A mixture of 37% aqueous formaldehyde and 10 g. of the tetrasulfonated reaction product obtained in Example VII was stirred and heated 120 hrs. The water was then evaporated by vacuum distillation and the residue was heated to a temperature of about 185° C. whereupon the material turned a brownish color. This brownish material was insoluble in hot water and possessed cation exchange characteristics at temperatures ranging from about 25 to about 200° C.

EXAMPLE IX

A mixture of 10 g. of the product obtained in Example VII and 1 g. of hexamethylenetetramine was heated to a temperature of about 230° C. in an oil bath. The mixture turned brown and resulted in a product which was insoluble in hot water and which possessed cation exchange properties.

EXAMPLE X

The procedure of Example I was followed except that methyl ethyl ketone was used as the solvent in place of benzene. In this case the reaction mixture was homogeneous throughout the total reflux time. The solvent was removed by distillation and the residual oil treated as before with acetic acid, then water.

The precipitated solid was a grey, amorphous product containing 0% residual chlorine and 1.77% hydroxyl group. Elemental analyses correspond to the following structure:

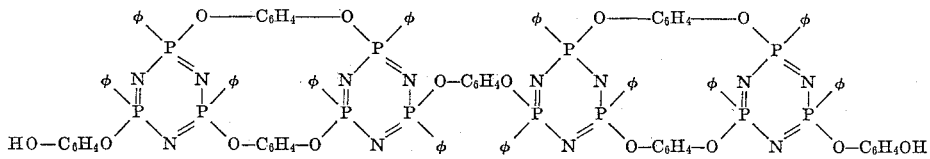

EXAMPLE XI

To 50 g. of the condensation product obtained in Example X was added 250 ml. of a mixture of 75 ml. of 30–33% oleum, and 175 ml. of concentrated sulfuric acid. The reaction mixture was black and was stirred 24 hrs. at room temperature, then poured into 2 l. of well agitated water. The precipitate was filtered and washed with water and dried. The yield was 36.7 g. of sulfonated condensation product which contained 2 sulfonic acid groups per mole. The elemental analysis of this product closely corresponds to that of the following structure:

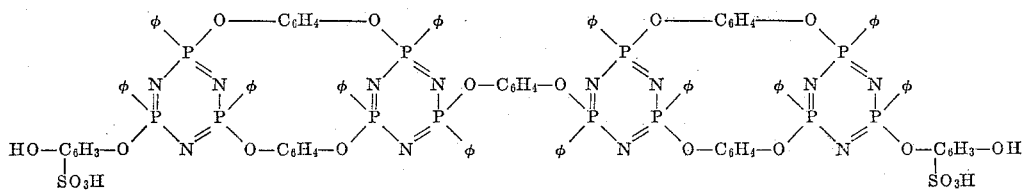

This material is insoluble in acetone, CHCl₃, and hot and cold water, and is useful as a cation exchange material above 150° C.

The aforementioned specific examples clearly indicate that useful sulfonated phosphonitrilic-polyhydroxyaromatic derivatives may be obtained using the teachings of the present invention.

We claim:

1. A sulfonated phosphonitrilic polyhydroxy aromatic condensation product prepared by sulfonating with an excess of fuming sulfuric acid the product of condensing, in the presence of a tertiary amine for about 0.5 to 10 hours at a temperature of about 60 to 150° C., a compound selected from the group consisting of cis 2,4,6-trichloro-2,4,6-triphenyltriphosphonitrile and trans 2,4,6-trichloro-2,4,6-triphenyltriphosphonitrile and mixtures thereof, and a polyhydroxy aromatic compound selected from the group consisting of

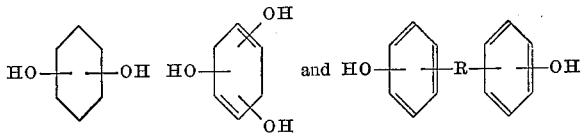

wherein R is selected from the group consisting of alkylene having 1-4 carbon atoms, oxygen, sulfur and NH, said product having from 2-10 cyclic trimeric phenylphosphonitrilic units bonded together and substantially esterified with said polyhydroxy aromatic units.

2. The condensation product of claim 1 containing from about 1 to about 12 sulfonic acid groups per polymer molecule on the average.

3. The compound of claim 1 wherein said polyhydroxy aromatic compound is hydroquinone.

4. The compound of claim 1 wherein said polyhydroxy aromatic compound is resorcinol.

5. The compound of claim 1 wherein said polyhydroxy aromatic compound is 2,2-propyl-p,p'-diphenol.

6. A crosslinked sulfonated phosphonitrilic-polyhydroxy aromatic condensation product which comprises the product of claim 1 reacted with a formaldehyde yielding source.

7. The product of claim 6 in which the source of formaldehyde is selected from the group consisting of hexamethylene-tetramine and aqueous formaldehyde.

8. The sulfonated resin of claim 1 prepared by reacting a phosphonitrilic resin selected from the group consisting of:

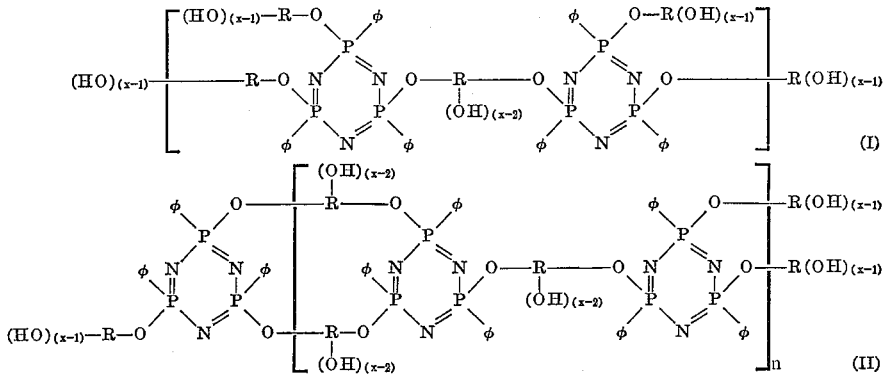

wherein R is selected from the group consisting of

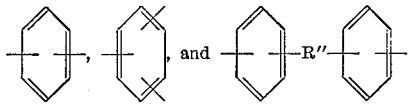

wherein R" is selected from the group consisting of alkylene having 1 to 4 carbon atoms, oxygen, sulfur and NH; and $x$ has a value of 2 or 3, and $n$ has a value of 1 to about 5, with oleum, and recovering the sulfonated resin formed thereby.

9. The composition of claim 8 wherein said oleum contains from about 5 to about 25% sulfur trioxide by weight.

10. The composition of claim 8 wherein said reaction is conducted at a temperature of from about 25 to about 65° C.

References Cited

UNITED STATES PATENTS 2,962,454  11/1960  McRae et al. _____ 260—2.2

OTHER REFERENCES

Vasil'ev et al., Chem. Ab. 53, 5545 B, 1959.

Vansheidt et al., Chem. Ab. 53, 19224a, 1959.

WILLIAM H. SHORT, *Primary Examiner.*

M. GOLDSTEIN, *Assistant Examiner.*